United States Patent [19]
Noodén et al.

[11] Patent Number: 4,581,056
[45] Date of Patent: Apr. 8, 1986

[54] SYNERGISTIC SENESCENCE DELAYING FOLIAR FERTILIZER COMPOSITION AND METHOD OF USING SAME TO DELAY SENESCENCE IN FIELD CROPS

[75] Inventors: Larry D. Noodén, Ann Arbor, Mich.; Ramon L. Garcia, Manlius, N.Y.

[73] Assignee: The Board of Regents of University of Michigan, Corp. of Michigan, Ann Arbor, Mich.

[21] Appl. No.: 493,536

[22] Filed: May 11, 1983

[51] Int. Cl.$^4$ ................................................. C05C 9/00
[52] U.S. Cl. ........................................... 71/28; 71/27; 71/64.1; 71/78; 71/99; 71/123
[58] Field of Search .................... 71/78, 99, 123, 1, 11, 71/28–30, 64.1, 64.02

[56] References Cited
U.S. PATENT DOCUMENTS
4,340,765  7/1982  Gray et al. ............................ 71/123

OTHER PUBLICATIONS
CA 90(19): 150893c, Neumann et al., 1979, "Late Season . . . Frequency".
CA 89(25) 2103125, Trifonova et al., 1976, "Content of Phosphorus . . . Mixtures".
CA 93(19) 182909d, Satler et al., 1980, "The Influence of . . . Senescence".

Primary Examiner—Ferris H. Lander
Attorney, Agent, or Firm—William T. Hough

[57] ABSTRACT

A composition and method for delaying the onset of senescence in certain crop plants by incorporation of one or more cytokinins in a foliar fertilizer composition containing one or more nutrients such as nitrogen and applying same to the foliage of plants.

38 Claims, No Drawings

SYNERGISTIC SENESCENCE DELAYING FOLIAR FERTILIZER COMPOSITION AND METHOD OF USING SAME TO DELAY SENESCENCE IN FIELD CROPS

BACKGROUND OF THE INVENTION

1. Field of the Invention

This invention relates to a unique foliar fertilizer formulation and method of applying same to legumes such as soybeans, cereal grain crops, such as corn (maize), and other crop plants such as cotton, potato, tomato and the like. More particularly, this invention relates to foliar fertilizer formulations and methods which provide outstanding increases in yield of field crops by delaying the onset of senescence.

2. Prior Art

Senescence or aging is the metabolic degradation of the biochemical machinery in the vegetative tissues of plants. It is disclosed in L. D. Nooden and S. J. Lindoo's *What's New in Plant Physiol*, 9(7), 25 (1978), that senescence in plants is probably initiated by a hormone-like substance which travels from the fruits to the leaves and other vegetative tissue. With the onset of senescence, the ability of vegetative tissues to assimilate nutrients from foliarly-applied fertilizers and to translocate other nutrients which may be present in the vegetative tissues to the reproductive tissues or crop declines. This results in a discontinuation of crop growth and no further increases in yield. Several beneficial effects on crop yield would result if the onset of senescence could be delayed. For example, a delay in senescence would maintain the nutrient assimilative capacity of the vegetative tissue of the plant, and allow such tissue to translocate such nutrients and any other nutrients which may be within the vegetative tissue to the reproductive tissue. The net result is an increase in the total assimilation and a transfer of more nutrients from the vegetative tissue to the reproductive tissue or fruit, all of which provides for increased fruit size and/or number and yields.

Several plant growth regulators have been used to delay senescence. For example, in D. J. Osborne, *Symp. Soc. Exp. Biol.*, 21, 305(1967), it discloses that cytokinins are the most generally effective class of senescence-retarding plant growth regulators. Similarly, L. D. Nooden, G. M. Kahanak and Y. Okatan, *Science*, 206, 841 (1979) disclose the use of a mixture of naphthaleneacetic acid and benzyladenine for delaying senescence in soybeans. (Also see Nooden, L. D. and A. C. Leopold, pp. 329–368 in Phytohormones and Related Compounds, Vol. II, D. S. Letham, et al, eds. (1978)).

In foliar feeding of plants, the nutrients are dissolved in water and the aqueous solution of nutrients is sprayed on the leaves of the plants. U.S. Pat. No. 3,087,806 describes a method for improving the yield of soybeans by spraying the plants periodically throughout their growth with an aqueous solution of urea phosphate. The patent recommends twice weekly applications; and in an example such twice weekly sprayings were carried out for a period of 18 weeks.

U.S. Pat. No. 3,558,300 describes a method for foliar feeding of field crops, including soybeans and cereal grains, with an aqueous solution of an ammonium polyphosphate. Adequate soil fertilizer is employed in conjunction with the foliar feeding. It is claimed that the method improves the stress resistance of the plants. The ammonium polyphosphate solution is described as being applied during the crop growth period up to the flowering period.

U.S. Pat. No. 4,038,064 describes a foliar fertilizer composition containing urea, water, potassium, phosphorus in the form of linear polyphosphates, and micronutrients such as sulfur, boron, zinc, iron, manganese and copper. The patent also describes a process of improving soybean plant yields by applying the composition to the foliage of the soybean plant. The patent states that the composition must be applied during the period from shortly before flowering to shortly after the beginning of seed fill.

U.S. Pat. No. 4,146,383 describes a method for improving the yield of legume field crops and cereal grain crops by applying a foliar fertilizer composition containing sources of nitrogen, phosphorus, potassium and sulfur to the foliage of the crops during the seed-filling period. The patent specifies that prior to the seed-filling period, nutrients are supplied to the growing legume and cereal crops exclusively from the ground.

U.S. Pat. No. 4,033,146 describes a method of fertilizing conifer forests with nitrogen containing compounds by direct aerial application to the conifer foliage of an aqueous solution containing a nitrogen source, such as urea, ammonia, and nitrates of ammonium, calcium, and potassium; ammonium phosphates and sulfates; or any combination. The patent states that other micronutrients including iron, manganese, copper and zinc can be added to the solution.

U.S. Pat. No. 4,033,747 discloses a method of fertilizing conifer forest by direct application to the foliage of the conifers of a solution containing a water-soluble nitrogen source. The patent also states that the solution may include sources of calcium, potassium, phosphorus, sulfur and minor trace metal nutrients such as iron, cobalt, molybdenum, manganese, copper, boron, zinc, magnesium and mixtures thereof.

It has been reported that mixed results have been achieved with foliar fertilization of crops, especially field crops and more particularly soybeans. While some tests suggested that yield improvements could be achieved, others suggested that no improvements at all were realized from foliar application of nitrogen-phosphorus-potassium (N-P-K) solutions. The January, 1969 issue of "World Farming" contains a more complete dissertation of the benefits of N-P-K foliar fertilization and the limits of application level beyond which leaf scorch occurs. Another article reprinted from Ohio Farm and Home Research, Vol. 41, No. 302, September–October, 1956, reports no benefit from foliar application N-P-K solutions.

Unsuccessful attempts to increase crop yield by foliar fertilization have been reported by Mederski and Volk for wheat, corn, soybeans, oats and alfalfa. When the field crops were grown in soils with adequate fertility, they failed to respond positively to foliar sprays containing N, P, and K. (Mederski, H. J. and Volk, G. W. *Foliar Fertilization of Field Crops*, Ohio Agr. Exp. Sta. Research Cir 35, (August 1956).) It has been generally assumed that legume and cereal grain crops which have adequate soil fertilization will not produce significantly higher yields of the grain by supplemental foliar fertilization, although it has been recognized that the nutrients in the spray are absorbed by the leaves of the plants.

It is disclosed in the prior art that mixtures of foliar fertilizers and cytokinins accelerate senescence. For example, in Neumann, P. M. and Giskin, M., "Late Season Foliar Fertilization of Beans with NPKS: Effects of Cytokinins, Calcium and Spray Frequency", *Comm. In Soil Science and Plant Analysis*, 10(3), 579-589 (1979),it discloses that sequential application of solutions of NPKS and benzyladenine to the foliage of bean plants during pod fill (*Phaseolus vulgaris*, var. Bulgarian) accelerated leaf senescence and did not increase yield beyond NPKS treatment.

SUMMARY OF THE INVENTION

The present invention is based on the discovery that inclusion of one or more cytokinin or compounds with cytokinin-like (e.g. senescence-delaying activity, hereinafter referred to collectively as "cytokinins") in aqueous fertilizers containing one or more plant macro- and micronutrients, such as one or more sources of nitrogen, phosphorus, sulfur, potassium and like materials which are indispensable to or advantageous to crop plants, for growth and metabolism, and application of the fertilizer to the foliage of such plants markedly delay the onset of senescence in such plants and promote uptake of foliarly applied nutrients. A further result of such application is an improvement in crop yield. Therefore, in accordance with this invention there is provided a method of delaying the onset of senescence in the aforementioned crop plants and thus enhancing the yield of such crop plants by applying to the foliage of such crop plants a "senescence-delaying effective amount" of a composition comprising one or more sources of nitrogen and optionally, one or more sources of potassium, one or more sources of phosphorus, one or more sources of sulfur and/or one or more sources of other plant micronutrients, and a synergistically effective amount of one or more cytokinins. This invention also provides a composition useful for delaying senescence which comprises one or more sources of nitrogen and/or other nutrients, and a "synergistically effective amount" of one or more cytokinins.

DESCRIPTION OF THE PREFERRED EMBODIMENTS

One essential ingredient of the composition for use in the method of this invention is a "synergistically effective amount" of one or more cytokinins. As used herein, a "synergistically effective amount" is an amount of such cytokinins which when admixed with the other ingredients of the composition is sufficient to enhance the senescence-delaying characteristics of such cytokinins to any extent. Usually, the above goal will be achieved if the composition contains at least about 0.0001 weight percent of said one or more cytokinins based on the total weight of the composition. In the preferred embodiments of the invention, the amount of said cytokinins contained in the composition will vary from about 0.0001 to about 10 weight percent based on the total weight of the composition, and in the particularly preferred embodiments, will vary from about 0.01 to about 2 weight percent on the same basis. Amongst these particularly preferred embodiments of the invention, most preferred are those in which the weight percent of cytokinins varies from about 0.05 to about 1.0 on the above described basis.

Within the above referenced limits the amount of one or more cytokinin or cytokinin-like compounds included in the composition of this invention is dependent upon the particular situation. Thus, in determining the amount to be used, consideration is made not only of the treatment need, i.e., growth stage of the plant, nutritional requirements and the like, but also of the mode of and the use conditions of the composition application. For example, in green-house applications, plant nutrients are normally supplied to the plant in dilute aqueous solutions, in large volumes per acre, in the range of from about 300 to about 1500 gallons per acre. Compositions of this invention used in such situations will normally contain amounts of the one or more cytokinins within the lower portions of the aforementioned concentration range, i.e., from about 0.0001 to about 0.01 weight percent, and preferably from 0.001 to about 0.01 weight percent. Alternatively, in field applications, plant nutrients are normally supplied to the plant in more concentrated aqueous solutions in smaller volumes per acre usually in the range of from about 6 to about 250 gallons per acre. Compositions of this invention used in such field applications will normally contain amounts of the one or more cytokinins within the upper portions of the aforementioned concentration range, i.e. amounts equal to or greater than about 0.01 weight percent.

The term "cytokinin" as used herein and as used by those of skill in the art is a generic name for chemical substances that promote cell division and exert other growth regulatory functions in the same or similar manner as kinetin described in U.S. Pat. No. 2,903,455. Cytokinins are believed to play an important role in all phases of plant development, from cell division and enlargement to the formation of flowers and fruits. They are known to affect metabolism including the activity of enzymes and biosynthesis of growth factors. They influence the appearance of organelles and the flow of assimilates and nutrients through the plant. They enhance its resistance to aging and to adverse environments. In general, they can be used to regulate cell division in plants, as represented by the use of kinetin for growth of excised tissues in vitro and to control plant development as represented by the use of different proportions for the formation of shoots and roots from undifferentiated parenchyma tissue, both as described in the aforementioned patent.

In the article entitled "Cytokinins", Annual Review of Plant Physiology, Vol. 21, 1970, pages 359-383, authored by Skoog and Armstrong; in the article entitled "Cytokinins: Syntheses, Mass Spectra and Biological Activity of Compounds Related to Zeatin", Proceedings of the National Academy of Science, Vol. 63, No. 1, 1969, pages 175-185, by Leonard, Hecht, Skoog and Schmitz; in the article entitled "Cytokinins Influence of Side-Chain Planarity of $N^6$-Substituted Adenines and Adenosines On Their Activity in Promoting Cell Growth", Phytochemistry, Vol. 9, 1970, pages 1907-1913, by Hecht, Leonard, Schmitz and Skoog; and in the article entitled "Cytokinins: Structure/Activity Relationships", Phytochemistry, Vol. 6, 1967, pages 1169-1192, by Skoog, Hamzi, Szweykowska et al., all of which are incorporated herein by reference, description is made of various of the more pertinent cytokinin compounds and the influence of various substituent groups on their cytokinin activity. More recently, Letham (pp. 205-264 in Phytohormones and Related Compounds, Vol. I, D. S. Letham et al, eds., 1978) has reviewed these structure-activity requirements covering more derivatives of the purine ring system and some nonpurine cytokinins. Some other nonpurines which retard senescence are mentioned by Nooden and Leopold, pp. 329-368 in "Phytohormones and Related Compounds", Vol. II, D. S. Letham et al, eds., (1978). Such cytokinin compounds are illustrative of those which can be employed in the practice of this invention.

Other useful cytokinins are those disclosed in U.S. Pat. No. 4,279,639 which describes certain N-(2-substituted-4-pyridyl)urea and thiourea type compounds which exhibit cytokinin-like properties. Also useful in the practice of this invention are the phenylureidotriazole compounds which are disclosed in U.S. Pat. No. 3,912,496 as exhibiting cytokinin-like activity. Other useful compounds which exhibit cytokinin-like activity, and which can be used in the practice of this invention are described in U.S. Pat. Nos. 4,169,717, 3,890,299, 3,988,338, and 3,983,104.

Illustrative of other useful chemicals with cytokinin-like properties which can be used in the practice of this invention are the N-substituted ureas and N,N'-disubstituted ureas, (especially N,N'-diphenylurea), N-substituted thioureas, and N,N'-disubstituted thioureas, azaindene and azanaphthalene derivatives, 4- and 5-substituted benzimidazoles, systemic benzimidazole fungicides, 6-(substituted amino)-8-azapurines, 1- and 3-diaza analogues of the adenine cytokinins, 4-(substituted amino)-pyrazolo-[3,4-d]-pyrimidines, 7-acylaminoimidazo-[4,5-c]-pyridines, certain pyrimidine derivatives (e.g. 4-benzylamino-6-methyl-pyrimidine and 6-methyluracil), certain herbicidal phenylurethanes, benzothiazol-2-yloxyacetic acid, SADH (succinic acid-2,2-dimethyl hydrazine), phosphon(tributyl-2,4-[dichlorobenzyl]phosphonium chloride), CCC (2-chloroethyl trimethylammonium chloride), B-9 (succinic acid-2,2-dimethyl hydrazine), ascorbic acid, chelating agents protein synthesis inhibitors, piperdinoacetanilides, atrazine, bromacil, flurometuron, hydroxyaninoline, aminotriazole and the like.

Preferred compounds for use in the practice of this invention are benzimidazoles, N-substituted ureas, N-substituted thioureas, N,N'-disubstituted ureas, N,N'-disubstituted thioureas, and adenine derivatives, especially with the purine ring intact. Most preferred compounds for use in this invention can generally be classified as purines having the general formulas:

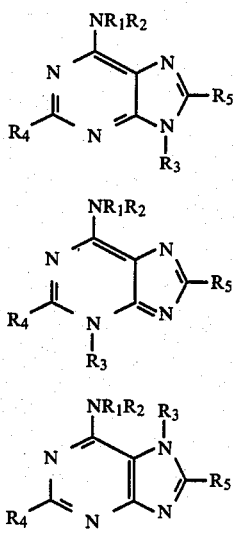

wherein $R_1$ and $R_2$ are the same or different and are hydrogen, or substituted or unsubstituted alkyl having having from 1 to about 10 carbon atoms or alkenyl having from 2 to about 10 carbon atoms wherein permissible substituents are one or more hydroxy, halo, cycloalkyl, cycloalkenyl, aryl, alkaryl, aralkyl or heterocyclic groups;

$R_3$ is hydrogen, alkyl, aryl, ribosyl or glucosyl; and $R_4$ and $R_5$ are individually hydrogen or alkyl. In the preferred embodiments of this invention, $R_1$ is hydrogen;

$R_2$ is substituted or unsubstituted alkyl having from about 1 to about 7 carbon atoms or alkenyl having from about 2 to about 7 carbon atoms; and $R_3$, $R_4$ and $R_5$ are individually hydrogen or methyl.

Particularly preferred are those compounds of the aforementioned formulas in which, $R_1$ is hydrogen; $R_2$ is alkyl or alkenyl having from 1 to 7 carbon atoms, either unsubstituted or substituted with one or more hydroxy; chloro; fluoro; bromo; aryl, preferably phenyl and naphthyl; cycloalkyl, preferably cyclopropyl, cyclopentyl, cyclohexyl and cycloheptyl; cycloalkenyl, preferably cyclopropenyl, cyclobutenyl, cyclopentenyl and cyclohexenyl; and heterocyclic, preferably pyridyl, pyrimidyl, pyranyl, thienyl, furfuryl, pyrrolidyl and morpholino. Most preferred for use in the practice of this invention are 6-furfurylaminopurine (kinetin), methylaminopurine, dimethylallylpurine, benzyladenine methylhydroxyallylaminopurine and diphenylurea, with benzyladenine, kinetin and diphenylurea being the cytokinins of choice.

As a second essential ingredient, the composition for use in the method of this invention includes one or more sources of "micro- and/or macronutrients." As used herein, "micro- and/or macronutrients" are materials which are essential or beneficial to plant growth. A preferred micro- and/or macronutrient is nitrogen. Illustrative of useful nitrogen sources are urea, ammonia, and ammonium and nitrate compounds, such as ammonium nitrate, potassium nitrate, ammonium sulfate, calcium nitrate, ammonium phosphate, ammonium polyphosphate and the like. Other useful sources of nitrogen include water-soluble urea and formaldehyde condensation such as methylolurea, methyleneureas and mixtures thereof. Illustrative of such useful water-soluble urea formaldehyde condensation products are those whose preparation and use are described in detail in U.S. Pat. No. 3,462,256. Still other useful nitrogen sources include water-insoluble urea formaldehyde condensation products such as ureaform. Illustrative of useful water-insoluble urea formaldehyde condensation products are the compounds whose preparation and use are described in detail in U.S. Pat. Nos. 3,677,746 and 4,033,745. Water-soluble nitrogen sources are preferred for use in practice of the invention, and ammonia, urea, ammonium nitrate, water-soluble urea formaldehyde condensation products are particularly preferred. Amongst these particularly preferred polymers, urea, ammonium salts, nitrate salts, and water-soluble urea formaldehyde condensation products are most preferred.

The fertilizer composition preferably includes sources of potassium, sulfur and phosphorus which are preferably in the form of water-soluble salts containing these materials. Illustrative of useful potassium salts are potassium chloride, potassium sulfate, potassium phosphate, potassium carbonate, potassium bicarbonate, potassium nitrate, potassium thiosulfate, potassium bisulfate, potassium polyphosphate and the like. Useful sulfur-containing salts include calcium sulfate, potassium sulfate, calcium polysulfate, ammonium sulfate, magnesium sulfate, sodium sulfate, potassium thiosulfate, zinc sulfate, zinc thiosulfate, manganese sulfate, iron sulfate, iron thiosulfate, cobalt sulfate, cuprous sulfate, cupric sulfate, cupric thiosulfate and the like. The phosphate requirements can be satisfied by various phosphate salts such as ammonium, magnesium or potassium orthophosphates, pyrophosphates and other condensed higher linear polyphosphates; and condensates of sulfur or nitrogen and phosphorous such as phosphoryl triamide, phosphoronitrilic hexamide and the like. Preferably, some portion of the phosphorus is in the form of a linear polyphosphate, although some orthophosphate and/or pyrophosphate can also be present. In these preferred embodiments, the number of phosphate groups in the polyphosphate usually range from 2 to about 10, but preferably, polyphosphates containing from about 3 to about 8 phosphate groups in the polyphosphate molecule are employed.

The amount of the micro and/or macronutrients included in the foliar fertilizer composition is not critical. Any amount known to those of skill in art for use in foliar fertilizer compositions can be employed. Normally, the amount employed will vary depending on the phytotoxic effect on the plant foliage of any particular source of macro- and/or micronutrients or combinations thereof, the times of application of the composition to the plant and frequency of such application and the like. In the preferred embodiments of this invention, the quantity of the nitrogen source may vary from about 0.5 to about 50 weight percent based on the total weight of the composition, and in the particularly preferred embodiments of the invention the quantity of nitrogen source may vary from about 1 to about 35 weight percent on the same basis. In the most preferred embodiments of the invention, the quantity of nitrogen source may vary from about 3 to about 25 on the above-referenced basis.

The concentrations of these non-nitrogeneous phosphorus, potassium and sulfur plant nutrients are expressed on a $P_2O_5$, $K_2O$ and S weight basis respectively. Generally, the quantities of such plant nutrients which are included in the composition of this invention are not critical to the advantage thereof, and can be varied widely depending on the needs of the user. In the preferred embodiments, the quantity of phosphorus is at least about 0.5 to 35 weight percent P (expressed as $P_2O_5$); the quantity of potassium is at least about 0.5 to 30 weight percent (expressed as $K_2O$ by weight) and the quantity of sulfur is at least from about 0.5 to about 10 weight percent (expressed as S by weight). In the particularly preferred embodiments, the weight percent phosphorus may vary from about 1 to about 25 weight percent, the weight percent of potassium may vary from about 1 to about 10, and the weight percent of sulfur may vary from about 1 to about 5, each expressed on the above-referenced basis. Amongst these particularly preferred embodiments most preferred are those embodiments in which the weight percent phosphorus may vary from about 1 to about 10, the weight percent of potassium may vary from about 1 to about 5 and the weight percent of sulfur may vary from 1 to 3.

The composition of this invention particularly includes a water component. The amount of water employed is not critical to the advantage of the invention and can be varied widely. The water component is preferably present in concentrations of up to about 90%, based on total composition weight, preferably from about 50 to about 75% on the same basis. The water concentration should be adequate to ensure adequate dispersion of the nutrients and in the preferred embodiments of the invention should be adequate to provide a product that is capable of being stored for reasonable times at the lowest expected ambient temperature, preferably about 32° F., without the components salting out of solution to any significant degree. The minimum dilution also aids in the prevention of burning of the plants by a more concentrated solution. On the other hand, in the preferred embodiments, the water concentration should not exceed about 75%, since higher dilutions would result in excessive application of the composition to the plan to provide the high nutrient levels contemplated by this invention, with resulting loss of such nutrients by run-off to the soil at a time when the roots are inefficient at translocating the materials from the soil to the fruit. The preferred water dilution of from about 50% to about 75% assures adequate dispersion on the one hand and minimum runoff on the other hand, resulting in maximum uptake by the plant of the N-P-K-S values in the solution.

Other micronutrients such as boron, zinc, iron, manganese, copper, molybdenum, cobalt and the like, either individually or in mixtures, may be included in the composition of this invention to correct trace metal deficiencies. Usually these micronutrients are added in the form of aqueous solutions of water-soluble salts or complexes of trace metals. Suitable water soluble salts include the sulfate, nitrate, halide carbonate, bicarbonate, bisulfate, thiosulfate, phosphate, hydrogen phosphate, dihydrogen phosphate, potassium, ammonium, sodium and the like salts of the aforementioned micronutrient trace metals. In addition, various chelating agents can be used to insure water-solubility of the applied trace metals. These chelating agents have two or more atoms, commonly referred to as dentate centers, in the molecule which are capable of forming an ionic or coordinate covalent bond with multivalent metal ions. The compounds are commonly called bidentate or polydentate compounds in reference to the number of dentate groups per molecule. The most common agents have oxygen and/or nitrogen atoms at such centers which are spaced in the molecule to form a 5,6 or 7 member ring when the multivalent metal ion is bridged across the centers. Such organic compounds thus have at least two dentate centers, i.e., nitrogen or oxygen atoms which are separated by 1 to about 3 carbon atoms. Typical substituents in organic molecules which furnish the oxygen and/or nitrogen centers are aldehyde groups, nitro groups, amide groups, carboxyl groups, ester groups, ketone groups, nitroso groups, hydroxyls, etc.

Examples of chelating agents suitable for use in accordance with the invention are:
citric acid,
ethylenediamine,
mono-sodium citrate,
N-methylethylenediamine,
N-ethyethylenediamine,
N-n-propylenediamine,
N-isopropylethylenediamine,
N-n-butylethylenediamine,
N-N-dimethylethylenediamine,
N,N-diethylethylenediamine,
N,N'-dimethylethylenediamine,
N,N'diethylethylenediamine,
N,N'-di-n-propylethylenediamine,
propylenediamine,
2,2-dimethy,-1,2-diaminoethane, 1,3-dimethyl-2-,3-diaminobutane,
trimethylenediame,
2,2-dimethyl-1,3-diaminopropane,
2-hydroxy-1,3-diaminopropane,
tetramethylenediamine,
pentamethylenediamine,
ethylenediamine-N,N'-dipropionic acid,
N-butylethylenediaminetriacetic acid,
N-cyclohexylethylene-diaminetriacetic acid,
N-hydroxyethylethylenediaminetriacetic acid,
ethylenediaminetetraacetic acid,
trimethylenediaminetetraacetic acid,
tetramethylenediaminetetraacetic acid,
pentamethylenediaminetetraacetic acid,
1,2-diaminocyclohexane-N,N'-tetraacetic acid,
ethylenediamine-N,N'dipropionic-N,N'-diacetic acid,
ethylenediamine-N,N'-tetrapropionic acid,
N-hydroxyethyl-N,N',N''-diethylenetriaminetetraacetic acid, and
diethylenetriaminepentaacetic acid.

The fertilizer composition of this invention may include other optional ingredients to improve the effectiveness of the composition, or to provide other beneficial biological effects. For example, the absorption of the composition by the foliage of plants can be accelerated by incorporation of minor amounts, e.g., from about 0.01 to about 10, preferably from about 0.01 to about 5 weight percent, of a surfactant. The surfactant improves the spreading of the composition on the foliage to achieve an even coverage and also assists in absorption of the fertilizer into the foliage. Suitable surfactants include cationic, anionic and nonionic types as well as mixtures thereof. Examples of the cationic surfactants include: fatty amines, e.g., dodecylamine, octadecylamine; alkarylamines, e.g., dodecyl aniline; fatty amides such as fatty imidazolines, e.g. undecylimidazoline prepared by condensing lauric acid with ethylene diamine, quaternary alkyl and aryl ammonium salts and hydrates, e.g., cetyltriethyl ammonium cetyl sulfate; quaternary ammonium bases of fatty amines of disubstituted diamines, e.g., oleyl methylaminoethylene, diethylaminemethyl sulfate and the like.

Examples of useful anionic surfactants include the following: fatty acid glyceride sulfonates and fatty acid sulfonates; e.g., sulfonated cottonseed oil, sulfonated oleic acid sulfonated sperm oil, sulfonated tallow, etc.; sulfonated fatty amides, e.g., sulfonated amide of ricinoleic acid, sodium salt of sulfuric ester of oleyl disobutyl amide, etc.; sulfonated anilides of fats, e.g., sodium salt of sulfuric ester of oleylethyl anilide; amides of aminosulfonic acids, e.g., sodium sulfonate of oleylmethyl tauride; amides from condensation of fatty acid chlorides with amino acids, e.g., sodium salt of oleyl sarcoside; sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates octadecylbenzene sulfonates and the like.

Illustrative nonionic surfactants include the polyethylene oxide condensates with hydrophobic groups having a reactive hydrogen. The hydrophobic group can have from about 8 to 5 carbon atoms and from 2 to about 15 molecular weights of a hydrophilic group. The hydrophobic group can be selected from a variety of organic compounds having one or more reactive hydrogens including fatty alkyl or alkenyl alcohols, fatty acids, fatty amines, fatty amides, esterified hexitans or alkyl or alkenyl phenols and the like.

The effectiveness of the composition can also be improved by incorporation of other adjuvants. Such useful adjuvants include humectants, such as molasses, carbowax, propylene glycol, glycerine, lecithin and other like adjuvants. The humectants could be expected to increase penetration of the active ingredients into the leaves by maintaining the moisture in the composition and by increasing due retention.

Various pesticides can be incorporated into composition to obtain a combined senescence delaying-fertilization-pesticidal treatment. The pesticides can be herbicides having a selective action for undesired vegetation or tree species or can be insecticides, larvicides, miticides, nematocides and the like. These pesticides can be synthetic or naturally occurring chemicals.

Various other non-cytokinin plant growth regulants can be included in the composition of this invention. Illustrative of useful plant growth regulants are auxins such as auxins based on the phenoxyalkanoic acid structure, as for example 2,4-dichlorophenoxyacetic acid, and salts and esters thereof; auxins based on the indolealkanoic acid structure, such as indoleacetic acid, and salts and esters thereof; and auxins based on the naphthalene-alkanoic acid structure, such as naphthaleneacetic acid, and salts and esters thereof. Other plant growth regulators such as triiodobenzoic acid, abscisic acid, Gibberellins, as for example Gibberellic acid, and the like can also be incorporated into the composition.

In the preferred embodiments of this invention, the cytokinin will be used in combination with one or more auxins. The amount of auxin employed may vary from about 0.0001 to about 10 weight percent based on the total weight of the composition, but preferably will vary from about 0.01 to about 2 weight percent on the same basis. In the particularly preferred embodiments of the invention, the weight percent of auxin will vary from about 0.05 to about 1.0. Preferred auxins are indolealkanoic acid, phenoxyalkanoic acid and naphthalenealkanoic acid based auxins and particularly naphthalene preferred auxins are naphthalenealkanoic acid based auxins.

As known to those of skill in the art, the pH of foliar fertilizer composition is critical to the phytotoxicity of the composition. Generally, compositions having very low or very high pH's are phytotoxic. In the preferred embodiments of the invention, the pH is from about 4.5 to about 8.5, and in the particularly preferred embodiments is from about 5.5 to about 7.5.

The composition can be conveniently prepared according to the conventional methods known to those of skill in the art, and therefore such methods will not be described herein in any great detail. Briefly stated, on method of formulating the composition of this invention is to merely dissolve selected sources of the essential components in an appropriate solvent, preferably a non-phytotoxic one, such as water.

The foliar fertilizer composition is preferably substantially free of undissolved fertilizer solids. Moreover, it is preferred to employ concentrated solutions, and to apply the solutions in the form of a fine mist. Conventional field spraying equipment can be used, including sprayers pulled through the fields by tractors, as well as aerial spraying equipment. While the solution concentrations (as distinguished from the nutrient ratios) are not critical, total solid concentrations on a solids to total solution weight basis can advantageously range from about 30 to 45% solids.

The composition can be conveniently used in accordance with the method of this invention to delay senescence in plants. The method is particularly applicable to the cultivation of soybeans, including both Northern and Southern varieties. However, it can also be applied to other legume field crops which are raised for the production of dry seeds, such as dry beans, dry peas, lentils, chick peas, pigeon peas and peanuts. The method is also believed to be applicable to the cultivation of field corn (maize) and other cereal grain crops, including sorghum, wheat, oats, barley, rye, millet, rice and popcorn, as well as other field crops believed to require nutrient ratios similar to corn such as rape, sunflowers, safflower, and sesame. Illustrative of other crops whose translocation of foliarly applied nutrients can be affected by the composition of this invention are fiber crops such as cotton, flax and the like; pasture crops such as various grasses, alfalfa and the like, and forest crops such as conifers such as pine, fir, hemlock and the like and hardwoods such as oak, teak, mahogany and the like, and softwoods, such as aspen, poplar and the like grown for pulp fur use in paper making, etc; and fruit crops such as cherry, apple, peach, plum citrus, and the like.

Timing of application is a significant and critical factor to obtain the best results. The composition of this invention is supplied to the plant just prior to the onset of senescence to obtain optimal results, and preferably applied throughout the period of development when the plant normally seneseces. If supplied much before the onset of senescence, good results are obtained, but early application does not result in as significant a delay in senescence as would normally be the case. Likewise, when application begins after the onset of senescence, a significant portion of the composition's value is also lost. For example, when the composition and method of this invention are used to delay senescence in cereal or grass crops, such as corn, oats, wheat, alfalfa, barley and the like, application of the composition will commence between about 30 to about 60 days past anthesis or flowering and preferably will continue through until harvesting. For soybeans, the vegetative and reproductive stages have been defined by Fehr, et al. *Crop Science*, 11, 929–931 (Nov.–Dec., 1971) as follows:

Vegetative Stages

Vegetative stages are determined by counting the number of nodes on the main stem, beginning with the unifoliolate node, which have or have had a completely unrolled leaf. A leaf is considered completely unrolled when the leaf at the node immediately above it has unrolled sufficiently so the two edges of each leaflet are no longer touching. At the terminal node on the main stem, the leaf is considered completely unrolled when the leaflets are flat and similar in appearance to older leaves on the plant.

| Stage No. | Description |
|---|---|
| V1 | Completely unrolled leaf at the unifoliolate node. |
| V2 | Completely unrolled leaf at the first node above the unifoliolate node. |
| V3 | Three nodes on main stem beginning with the unifoliolate node. |
| V(N) | N nodes on the main stem beginning with the unifoliolate node. |

| Stage No. | Description |
|---|---|
| R1 | One flower at any node. |
| R2 | Flower at node immediately below the uppermost node with a completely unrolled leaf. |
| R3 | Pod 0.5 cm (¼inch) long at one of the four uppermost nodes with a completely unrolled leaf. |
| R4 | Pod 2 cm (¾inch) long at one of the four uppermost nodes with a completely unrolled leaf. |
| R5 | Beans beginning to develop (can be felt when the pod is squeezed) at one of the four uppermost nodes with a completely unrolled leaf. |
| R6 | Pod containing full size green beans at one of the four uppermost nodes with a completely unrolled leaf. |
| R7 | Pods yellowing; 50% of leaves yellow. Physiological maturity. |
| R8 | 95% of pods brown. Harvest maturity. |

As used herein, the terms vegetative stages and reproductive stages with respect to soybeans have the meanings set out above.

The rate of application should be such that a "senescence-delaying amount" of the composition is applied to the plant. As use herein, a "senescence-delaying amount" is an amount which is effective to delay the onset of senescence to any extent. The rate of application will depend on a number of factors, such as environmental conditions, type of crop, concentration of various ingredients in the composition and the like.

The composition is usually applied at a rate of from about 1 to about 600 pounds of nitrogenous nutrients per acre, in a total applied aqueous volume of from about 3 to about 1500 gallons per acre. In the preferred embodiments of the invention, the composition is applied at a rate of from about 2 to about 100 pounds of nitrogenous nutrients per acre in a total applied aqueous volumes of from about 6 to about 250 gallons per acre, and in the particularly preferred embodiments at a rate of from about 3 to about 30 pounds per acre in a total volume of from about 9 to about 75 gallons per acre.

An especially effective embodiment of the composition of this invention having a pH of from about 4.5 to about 8.0 is as follows:

a. $H_2O$: from about 25 to about 90%; preferably from about 50 to about 75% (expressed as weight);

b. Urea, ammonium, nitrate and/or other sources of nitrogen either singly or in any combination: from about 0.5 to about 50%, preferably from about 1 to about 35% (expresed as percent N by weight);

c. Phosphorus: from about 0.5 to about 35%, preferably from about 1 to about 25% (expressed as $P_2O_5$ by weight);

d. Potassium: from about 0.5 to about 30%, preferably from about 1 to about 10% (expressed as $K_2O$ by weight);

e. Sulfur: from about 0.5 to about 10%, preferably from about 1 to about 5% (expressed as S);

f. Cytokinins, such as benzyladenine, kinetin and diphenylurea: from about 0.0001 to about 10%, preferably from about 0.01 to about 2%;

g. Other micronutrients such as boron, zinc. iron, manganese and copper: None to nominal amounts as desired; and h. Auxin, such as 2,4-dichlorophenoxyacetic acid, naphthaleneacetic acid and indoleacetic acid, from about 0.01 to about 10%, preferably from 0.05 to 2%.

This composition when used in the preferred method of this invention is applied to the foliage of crops by a fine spray applicator between just before the onset of senescence and harvesting without damage to foliar tissue, and results, in most instances, in a significant yield increase at harvest, when applied at the rate of at least 25 pounds aggregate N—$P_2O_5$—$K_2O$—S—cytokinin per acre in the following proportions:

| Component | Rate of Application, lbs./Acre |
|---|---|
| Nitrogen (as N) | from about 0.5 to about 50, preferably from about 1 to about 35 |
| Phosphorus (as $P_2O_5$) | from about 0.5 to about 35, preferably from about 1 to about 15 |
| Potassium (as $K_2O$) | from about 0.5 to about 30, preferably from about 1 to about 10 |
| Sulfur (as S) | from about 0.5 to about 10, preferably from about 1 to about 5 |
| Cytokinin | from about 0.0001 to about 10, preferably from about 0.01 to about 2 |
| Auxin | from about 0.0001 to about 10, preferably from about 0.01 to about 2. |

In the presently preferred embodiment, the aggregate rate of application is 40-150 pounds of N-cytokinin—$P_2O_5$—$K_2O$—S per acre, preferablly 40-75 pounds of N-cytokinin—$P_2O_5$—$K_2O$—S per acre.

The following specific examples further illustrate the invention.

EXAMPLE I

The synergistic effect of complete mineral nutrient solution combined with cytokinin (zeatin) on leaf yellowing and seed yield in soybean explants (variety Anoka) taken at early-mid pod fill was studied. The explant is a model system which allows easy and vigorous control of hormonal and nutrient inputs and environmental conditions compared with intact plants, especially field-grown plants where variability may obscure very significant effects. The explant consisted of a stem cutting with a leaf, one or more pods (here reduced to one pod with 3 seeds in order to standardize the system) at the node next to the leaf and a subtending segment of stem. The exact temperature and light regimes used are described by Neumann, Tucker and Nooden, Plant Physiology, 67 (Supp);71 (1983) and Plant Physiology, 71; In press (1983). The explants used in these experiments were started at early-mid pod fill (a stage about ⅓ of the way between $R_5$ and $R_6$ growth stages). This is a particularly critical time for seed growth, because the demand for assimilates is very high and the assimilatory capacity of the foliage is already starting to decline as a prelude to visible senescence (leaf yellowing).

The nutrient solution used in this experiment which had a pH of from 5.5 to 5.8 is as set forth in the following Table I.

TABLE I
MINERAL NUTRIENTS

| Macronutrients: | % wt/wt |
|---|---|
| Allantoin (main N source) | 0.0336 |
| $Ca(NO_3)_2$ | 0.0025 |
| $KNO_3$ | 0.0016 |
| $K_2HPO_4$ | 0.0031 |
| $KH_2PO_4$ | 0.0027 |
| KCl | 0.0015 |
| $MgSO_4$ | 0.0030 |

TABLE I-continued
MINERAL NUTRIENTS

| Micronutrients: | % wt/wt × $10^3$ |
|---|---|
| $H_3BO_3$ | 0.0656 |
| $MnSO_4 \cdot H_2O$ | 0.0143 |
| $CuSO_4 \cdot 5H_2O$ | 0.0530 |
| $ZnSO_4 \cdot 7H_2O$ | 0.0244 |
| $(NH_4)_6Mo_7O_{24}$ | 0.00074 |
| FeEDTA | 0.292 |

A test composition was formulated by addition of an amount of zeatin to the nutrient solution sufficient to provide a test formulation containing 0.0001% wt/wt of zeatin based on the total weight of the final formulation. The stem of the explant was placed in the test formulation and the effects on leaf yellowing and seed yield were observed.

The results of these experiments are set forth in the following Table II.

TABLE II

| Treatment | Delay in leaf yellowing (days) | Increased Seed Yield (% increase in dry weight over water control) |
|---|---|---|
| $H_2O$ only (control) | 0 | 0% |
| Nutrient solution | 1.5 | 25% |
| Zeatin | 5.5 | 6% |
| Test Formulation | >10 | 37% |

The data shown above in Table II show the positive synergistic effect of the combination of mineral nutrients and cytokinins contained in the test formulation (supplied via the transpiration stream) in delaying leaf yellowing (and maintaining the assimilatory capacity of the leaves) and seed growth (yield).

EXAMPLE II

The synergistic effect of the major mineral nutrients (nitrogen, phosphorus, potassium and sulfur "NPKS") combined with cytokinin (benzyladenine "BA") on leaf yellowing and seed yield in soybean explants (variety Anoka) taken at early-mid podfill was studied. These explants carried a very heavy pod load (2-3 pods, 8 seeds).

The aqueous mineral solution used in the experiments which had a pH of from 6.2 to 6.4 is as set forth in the following Table III.

TABLE III
Composition of Minerals NPKS

| Macronutrients: | Amounts in % wt/wt |
|---|---|
| $NH_4NO_3$ | 0.068 |
| $KNO_3$ | 0.073 |
| $K_2HPO_4$ | 0.055 |
| $KH_2PO_4$ | 0.090 |
| KCL | 0.049 |
| $K_2SO_4$ | 0.143 |

A test formulation was prepared by addition of an amount of benzyladenine to the mineral solution sufficient to provide a formulation containing 0.0011% wt/wt benzyladenine based on the total weight of the composition.

The mineral solution and the test solution were sprayed onto the leaves right after the explants were cut at early-mid podfill until run-off. Another aqueous solution containing 0.0011% wt/wt benzyladenine based on the total weight of the solution was applied to another explant at the same rate of application and growth period as the first solutions. All solutions contained 0.05% Tween 80 a theoleate ester. of sorbital and its anhydride copolymerized with approximately 20 moles of ethylene oxide per mole of sorbital and sorbital anhydride. After application of the solutions, the explants were then placed in water and the effects on leaf yellowing and seed yield were observed.

The results of these experiments are set forth in the following Table IV.

TABLE IV

| | Delay in leaf yellowing (days) | Increased Seed Yield (% increase in dry weight over water control) |
|---|---|---|
| Control H$_2$O | 0 | 0% |
| Mineral Solution | 3 | 4 |
| BA Solution | 3 | −4 |
| Test Formulation | 4 | 19 |

Table IV shows the positive synergistic effects of the cytokinin, benzyladenine (BA) combined with the major mineral nutrients (NPKS) on seed growth.

EXAMPLE III

The synergistic effect of the major mineral nutrients "NPKS" combined with cytokinin benzyladenine "BA") plus auxin (alpha-naphthalene acetic acid "NAA") on leaf yellowing and seed yield in soybean explants (variety Anoka) taken at early-mid podfill was studied. Each explant carried one pod with 3 seeds. A test formulation was formulated by addition to the mineral solution used in Example II of sufficient BA and NAA to provide a solution containing 0.0011 weight percent BA, and 0.0009 weight percent NAA based on the total weight of the composition. The mineral solution used in Example II and the test formulation were sprayed onto the leaves right after the explants were cut at early-mid podfill until run-off, and the explants placed in water. Another aqueous solution containing 0.0011 weight percent of BA and 0.0009 weight percent of NAA was applied to another explant at the same rate and growth period as the first solutions, and the explant placed in water. All solutions contained 0.05% Tween 80 as a surfactant and the same concentrations of NPKS minerals used in Example II.

The results of these experiments are set forth in the following Table V.

TABLE V

| Treatment | Delay in leaf yellowing (days) | Increased Seed Yield (% increase in dry weight over water control) |
|---|---|---|
| Control, H$_2$O | 0 | 0 |
| Mineral Solution | −1 | 28 |
| NAA and BA | 15 | −17 |
| Test Formulation | >20 | 45 |

Table V shows the positive synergistic effects of the major mineral nutrients (NPKS) combined with the synthetic cytokinin benzyladenine (BA) and auxin alpha-naphthalene acetic acid (NAA) on leaf yellowing and seed growth.

EXAMPLE IV

The effect of auxin (NAA) and cytokinin (BA) on uptake of foliar-applied 32P into the terminal (center) leaflet of soybean explants was studied. As in Examples I-III, explants were cut at early-mid podfill. An aqueous solution containing 0.0011 weight percent BA, 0.0009 weight percent and 0.05 weight percent Tween 80 based on the total weight of the solution and an aqueous solution containing 0.05 weight percent Tween 80 (control) were sprayed onto the leaves of intact plants. After 24 hrs, the explants were cut and $^{32}$P—KH$_2$PO$_4$ (in the 0.05% Tween 80 solution and the NAA and BA solution was applied to a circular zone (a well ringed with lanolin, inner diameter about 2 cm). The explants were then placed in water, and after 24 hrs., the zone of $^{32}$P application was excised and floated treated-face down in 1μM KH$_2$PO$_4$ solution for 40 min. The $^{32}$P in the KH$_2$PO$_4$ wash medium is the non-absorbed $^{32}$P, while $^{32}$P retained by the disk is absorbed $^{32}$P.

The results of the experimentation are set forth in Table VI.

TABLE IV

| Foliar Treatment | % applied Non-absorbed* | $^{32}$P$_i$ Absorbed** |
|---|---|---|
| Control (0.05% Tween-80) | 40.4 | 59.6 |
| NAA, BA and Tween-80 Solution | 28.8 | 71.2 |

EXAMPLE V

The effect of foliar fertilizer in combination with cytokinin and other plant growth regulators on leaf senescence (yellowing) and yield of soybeans was studied in the field in New York. In these studies, an aqueous solution containing 12% urea (expressed as %N by weight), 4% of a mixture of ortho, pyro and higher polyphosphates (expressed as % P$_2$O$_5$ by weight), 4% potassium phosphate or sulfate (expressed as % K$_2$O by weight), and 0.5% potassium or ammonium sulfate (expressed as % S by weight), said mixture hereinafter referred to as "Fertilizer", was sprayed with and without a mixture of a benzyladenine (BA 0.23% wt./wt.) and napthalene-acetic acid (NAA 0.06% wt./wt.), on soybeans (variety Evans) at the rate of 10 gal/acre and at the R$_5$ stage of growth. Another aqueous solution containing 0.23% wt/wt benzyladenine on 0.06% wt/wt naphthalene acetic acid was applied to the soybeans at the same rate and growth period as the first solutions. Data from this experiment are depicted in Table VII.

TABLE VII

| | Percent of Control | |
|---|---|---|
| Treatment* | Leaf Yellowing** | Yield |
| Untreated Control | 100% | 100% |
| BA plus NAA Alone | 81 | 94 |
| Fertilizer Alone | 88 | 89 |
| BA plus NAA plus Fertilizer | 42 | 111 |

*All formulations contained 1% (wt./wt.) gelatin.
**Measured 6 days after application.

Example VI

The effect of foliar fertilizer in combination with cytokinin and other plant growth regulators on leaf senescence (yellowing) and yield of soybeans was studied in the field in New York. Fertilizer was sprayed at the rate of 10 gal/acre with and without 0.23% wt./wt. PROMALIN ® (a commercial formulation consisting of equal concentrations of a cytokinin, benzyladenine (1.8% wt./wt.), and giberellic acid (GA$_4$+GA$_7$, 1.8 wt./wt.) manufactured and sold by Abbott Laboratories Incorporated Chicago, Ill. The soybeans (variety Evans) were sprayed at the R$_5$ stage of growth. An aqueous solution containing 0.23% wt/wt of PROMA- LIN was also applied to soybean at the same rate and growth period as the other solutions. Data from this experiment are depicted in Table VIII.

TABLE VIII

| Treatment* | Percent of Control | |
|---|---|---|
| | Leaf Yellowing** | Yield |
| Untreated Control | 100% | 100% |
| PROMALIN ® Alone | 82 | 112 |
| Fertilizer Alone | 93 | 126 |
| PROMALIN ® plus Fertilizer | 71 | 131 |

*All formulations contained 1% (wt./wt.) gelatin.
**Measured 6 days after application.

Example VII

The effect of foliar fertilizer in combination with cytokinin on leaf senescence (yellowing) and yield of soybeans was studied in the field in New York. Fertilizer was sprayed with and without benzyladenine (0.23% wt./wt.). The soybeans (variety Evans) were sprayed (10 gal/acre) at the $R_5$ stage of growth. An aqueous solution containing 0.23% wt/wt of benzyladenine was also applied to soybean at the same rate and growth period as the other solutions. Data from this experiment are depicted in Table IX.

TABLE IX

| Treatment* | Percent of Control | |
|---|---|---|
| | Leaf Yellowing** | Yield |
| Untreated Control | 100% | 100% |
| Benzyladenine Alone | 65 | 93 |
| Fertilizer Alone | 88 | 89 |
| Benzyladenine plus Fertilizer | 58 | 106 |

*All formulations contained 1% (wt./wt.) gelatin.
**Measured 6 days after application.

Example VIII

The effect of foliar fertilizer in combination with succinic acid 2,2-dimethylhydroxide (SADH, a cytokinin-mimic that delays senescence) on leaf senescence (yellowing) and yield of soybeans was studied in the field in New York. Fertilizer was sprayed with and without SADH (0.23% wt./wt.). The soybeans (variety Hodgson) were sprayed at the rate of 10 gal/acre at the $R_5$ stage of growth. An aqueous solution containing 0.23% wt./wt. of SADH was applied to soybean at the same rate and growth period as the other solutions. Data from this experiment are depicted in Table X.

TABLE X

| Treatment* | Percent of Control | |
|---|---|---|
| | Leaf Yellowing** | Yield |
| Untreated Control | 100% | 100% |
| SADH Alone | 85 | 94 |
| Fertilizer Alone | 54 | 96 |
| SADH plus Fertilizer | 54 | 106 |

*All formulations contained 1% (wt./wt.) gelatin.
**Measured 6 days after application.

Example IX

The effect of foliar fertilizer in combination with cytokinin on senescence delay in soybeans was studied in the field in New York. Fertilizer was sprayed at the rate of 10 gal/acre with and without benzyladenine (0.23% wt./wt.) on soybeans (variety Hodgson) at the $R_5$ stage of growth. An aqueous solution containing 0.23% wt./wt. benzyladenine was also applied to soybean at the same rate and growth period as the other solutions. Data from this experiment are depicted in Table XI.

TABLE XI

| Treatment* | Percent Leaf Yellowing** |
|---|---|
| Untreated Control | 100% |
| Benzyladenine Alone | 77 |
| Fertilizer Alone | 155 |
| Benzyladenine and Fertilizer | 32 |

*All formulations contained 1% (wt./wt.) gelatin.
**Measured 14 days after application.

What is claimed is:

1. An improved aqueous foliar fertilizer composition of the type which is applied to the foliage of plants, said composition comprising one or more micro and/or macronutrients, and a synergistically senescence-delaying effective amount of one or more cytokinins, and pH being adjusted to be within a range of from about 4.5 to about 8.5.

2. A composition of claim 1 which further comprises one or more macronutrients selected from the group consisting of phosphorus, potassium, sulfur and nitrogen.

3. A composition of claim 1 wherein said one or more sources of nitrogen are selected from the group consisting of urea, ammonium salts, nitrate salts and water-soluble urea and formaldehyde condensation products.

4. A composition of claim 3 wherein said source of nitrogen is selected from the group consisting of urea, ammonium salts and nitrate salts.

5. A composition according to claim 4 wherein said source of nitrogen is urea.

6. A composition of claim 1 wherein said amount of said one or more cytokinins is from about 0.0001 to about 10 weight percent based on the total weight of the composition.

7. A composition of claim 6 wherein said amount is from about 0.01 to about 2 weight percent.

8. A composition of claim 7 wherein said amount is from about 0.05 to about 1 weight percent, and said pH being within a range of from about 5.5 to about 7.5.

9. A composition of claim 8 wherein $R_1$ is hydrogen.

10. A composition of claim 11 wherein $R_2$ is substituted or unsubstituted alkyl or alkenyl having from 1 to about 7 carbon atoms.

11. A composition of claim 10 wherein said permissible substituents are one or more hydroxy, aryl, heterocylic, or halo.

12. A composition of claim 11 wherein $R_3$, $R_4$ and $R_5$ are individually hydrogen or methyl.

13. A composition of claim 11 wherein $R_3$, $R_4$ and $R_5$ are hydrogen.

14. A composition of claim 13 wherein said one or more cytokinins are selected from the group consisting of zeatin, kinetin, benzyladenine, methylaminopurine, and dimethylallylpurine.

15. A composition of claim 14 wherein said cytokinin is benzyladenine.

16. A composition of claim 1 wherein said one or more cytokinins are selected from the group consisting of benzimidazoles, N-substituted thioureas, N-substituted ureas, N,N'-disubstituted ureas, N,N'-disubstituted thioureas, and compounds of the formulas:

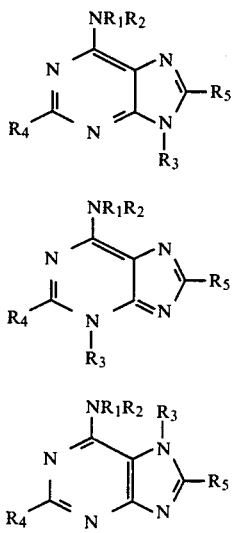

wherein:

R₁ R₂ are the same or different and are hydrogen, or substituted or unsubstituted alkyl or alkenyl having from 1 to about 10 carbon atoms wherein permissible substituents are one or more hydroxy, halo, cycloalkyl, cycloalkenyl, alkanyl, aralkyl or heterocyclic;

R₃ is hydrogen, alkyl, aryl, ribosyl or glycosyl; and R₄ and R₅ are individually hydrogen or alkyl.

17. A composition of claim 16 wherein said cytokinins are selected from the group consisting of compounds of the formula:

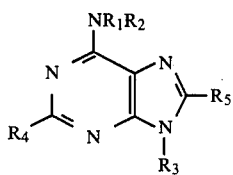

18. A composition of claim 16 wherein said one or more cytokinins are selected from the group consisting of N-substituted urea and N,N-disubstituted urea compounds.

19. A composition of claim 18 wherein said urea compound is diphenylurea.

20. A method of delaying the onset of senescence in plants, which comprises treating the foliage of said plant with a composition according to claim 1.

21. A method of claim 20 wherein said composition is applied to the foliage of said plant at anytime during the period from just before the onset of senescence harvesting.

22. A method of claim 20 wherein said composition further comprises one or more auxins.

23. A method of claim 20 wherein said plant is selected from the group consisting of a legume crop, a cereal grain crop, vegetable crops, forage crops, fiber crops and forest crops.

24. A method of claim 23 wherein said plant is a legume crop.

25. A method of claim 23 wherein said plant is soybean.

26. A method of claim 23 wherein said plant is a cereal grain crop.

27. A method of claim 26 wherein said cereal grain crop is corn.

28. A method of claim 26 wherein said cereal grain crop is wheat.

29. A method of claim 23 wherein said plant is a vegetable crop.

30. A method of claim 23 wherein said plant is a forage crop.

31. A method of claim 23 wherein said plant is a fiber crop.

32. A method of claim 23 wherein said plant is a forest crop.

33. A composition capable of being applied as a foliar spray fertilizer, said composition comprising a solution of the following constituents:
 a. H₂O: from about 25 to about 90% (by weight);
 b. Nitrogen: from about 0.5 to about 50% (% Nitrogen by weight);
 c. Phosphorus: from about 0.5 to about 35% (P₂O₅) by weight);
 d. Potassium: from about 0.5 to about 30% (K₂O by weight);
 e. Sulfur: from about 0.5 to about 10% (S by weight); and
 f. One or more cytokinins: from about 0.0001 to about 10%.

34. The composition of claim 33 containing at least one micronutrient selected from the group consisting of boron, zinc, iron, manganese and copper present in nominal amount.

35. The composition of claim 33 which further comprises one or more auxins.

36. A composition of claim 35 wherein said auxins are selected from the group consisting of 2,4-dichlorophenoxyacetic acid, indoleacetic acid and naphthaleneacetic acid.

37. A composition of claim 36 wherein said auxin is 2,4-dichlorophenoxyacetic acid or napthaleneacetic acid.

38. A composition of claim 37 wherein said auxin is naphthaleneacetic acid.

* * * * *